United States Patent [19]

Borsuk et al.

[11] 4,181,402

[45] Jan. 1, 1980

[54] SINGLE OPTICAL FIBER CONNECTOR

[75] Inventors: Leslie M. Borsuk, Los Alamitos; Patrick G. Corrales, Garden Grove, both of Calif.

[73] Assignee: International Telephone and Telegraph Corporation, New York, N.Y.

[21] Appl. No.: 944,693

[22] Filed: Sep. 22, 1978

[51] Int. Cl.$^2$ ............................................... G02B 5/14
[52] U.S. Cl. .................................................. 350/96.21
[58] Field of Search ................. 350/96.20, 96.21, 96.22

[56] References Cited

U.S. PATENT DOCUMENTS

| 4,087,155 | 5/1978 | Deacon | 350/96.21 |
| 4,130,344 | 12/1978 | Lemonde | 350/96.21 |

FOREIGN PATENT DOCUMENTS

| 2602662 | 7/1977 | Fed. Rep. of Germany | 350/96.21 |
| 2800930 | 7/1978 | Fed. Rep. of Germany | 350/96.21 |

*Primary Examiner*—Stewart J. Levy
*Attorney, Agent, or Firm*—Thomas L. Peterson

[57] ABSTRACT

A connector for coupling a pair of single optical fibers is disclosed. Each contact of the connector utilizes three spheres of equal diameter defining a tricuspid interstitial space therebetween into which the end of a fiber is mounted. When a pair of contacts is mated in axial abutting relationship, the spheres in the mating abutting contacts nest with respect to each other, thereby precisely laterally aligning the optical fibers which are mounted in the interstitial spaces of the sets of spheres in the two contacts. A spring sleeve is mounted on a cap threaded onto the forward end of each contact body. The spring sleeve embodies three resilient fingers which urge the spheres inwardly and rearwardly under a controlled force determined by cooperating abutting shoulders on the threaded cap and contact body, thus avoiding the fracturing of an optical fiber mounted in the interstitial space between the spheres.

11 Claims, 3 Drawing Figures

SINGLE OPTICAL FIBER CONNECTOR

The United States Government has rights in this invention pursuant to Contract No. DAAB07-76-C-1357 awarded by the Department of the Army.

BACKGROUND OF THE INVENTION

The present invention relates generally to a connector and, more specifically, to an optical connector for single optical fibers.

One of the most difficult problems in making low loss connections between optical fibers in an optical communication system is the achievement of lateral alignment of the fibers. U.S. Pat. No. 4,087,155 to Deacon, assigned to the assignee of the present application, discloses a connector for coupling a pair of single optical fibers which provides precise lateral alignment between the fibers. Each contact of the connector utilizes three spheres of equal diameter defining a tricuspid interstitial space therebetween into which the end of the fiber is mounted. The spheres are arranged in closely adjacent, but not necessarily engaging relationship in each contact. The centers of the spheres of each contact lie in a common plane normal to the axial length of the optical fiber. The spheres are dimensioned, to a close tolerance, to closely confine the fiber in the interstitial space. The spheres of one of the contacts abuts under an axial compression force against those of the other contact so that the spheres nest with respect to each other, whereby the optical fiber in the space of said one contact is brought into close lateral alignment with that of the mating contact. The mounting of a fiber in such a contact creates no problem so long as the diameter of the fiber is sufficiently small so that it can be inserted into the interstitial space between the spheres without an interference fit. However, because of varying fiber diameter tolerances, some fibers are too large to insert into the interstitial space between the spheres.

Copending application of R. L. McCartney, Ser. No. 861,110 filed Dec. 16, 1977, entitled: "Single Optical Fiber Connector", assigned to the assignee of the present application, overcomes this problem by incorporating adjusting means with the spheres for accommodating larger diameter fibers. More specifically, the McCartney application teaches the use of a containment sleeve which is slidable on the contact body adjacent to its foward end. A radially inwardly directed lip on the forward end of the sleeve retains the spheres against the front face of the contact body. A coil spring surrounding the body inside the sleeve engages a radially inwardly extending flange at the rear of the sleeve biasing the sleeve rearwardly on the contact body, whereby the lip exerts a radially inwardly and rearwardly directed force against the spheres to contain and consolidate the spheres in the front of the contact. By pushing the containment sleeve forwardly on the contact body against the force of the spring, the resilient force against the spheres is released, thereby allowing an optical fiber to be inserted into the interstitial space between the spheres, even if the fiber is slightly oversized. The sleeve is then allowed to move rearwardly by the force of the spring so that the inwardly directed lip on the sleeve will urge the spheres inwardly to consolidate about the fiber. Thus, the interstitial space is automatically adjusted to accommodate the actual diameter of the optical fiber used without interfering with the nesting action of the spheres between a pair of mated contacts.

While the arrangement disclosed in the aforementioned McCartney application is generally satisfactory, because the slidable sleeve acting on the spheres is manually operable without close control and the force of the coil spring is relatively high, occasionally the force applied by the spring through the sleeve to the spheres is too great, or uncontrolled, causing the spheres to crush the optical fiber mounted in the interstitial space therebetween. Furthermore, because the sleeve is loose on the connector body, it is possible for the spheres to vibrate when the connector is subjected to shock or vibrations, with the result that light transmission losses in the connector will occur. It is the object of the present invention to overcome the aforementioned problems by providing means for producing a controlled constant force upon the spheres of the contact, yet is adjustable to that the spheres may assume a loose position within the contact thereby facilitating optical fiber installation therebetween.

SUMMARY OF THE INVENTION

According to the principal aspect of the present invention, there is provided a single optical fiber contact for a fiber optic connector comprising a support body having a forward mating end with a set of spheres of equal diameter positioned at said end. The spheres are arranged in closely adjacent, but not necessarily engaging, relationship defining an interstitial space therebetween. The support body embodies means for positioning a single optical fiber so that the end portion thereof lies in the interstitial space. The spheres are dimensioned to each engage the optical fiber in the space. A plurality of inwardly and forwardly extending resilient fingers are fixedly mounted at the forward end of the support body. The fingers urge the spheres inwardly toward the center of the space. The forwardmost surfaces of the spheres extend forwardly of the resilient fingers for nesting with the spheres of a mating contact.

In a preferred embodiment of the invention, the resilient fingers are integral with a spring sleeve which may be precisely fabricated by standard stamping processes so that the spring force applied by the fingers against the spheres may be closely controlled, such that the force is less than that which would cause a fiber to crush if the fiber has an interference fit in the interstitial space between the spheres. Further, because the resilient fingers are fixedly mounted on the contact body, the relative sliding movement between the containment sleeve and the contact body in the McCartney device is eliminated, thus avoiding the somewhat unstable mounting of the spheres at the front of the contact body which may result in light transmission losses when the connector is subjected to vibration forces.

DESCRIPTION OF THE PREFERRED EMBODIMENTS

Figure 1:
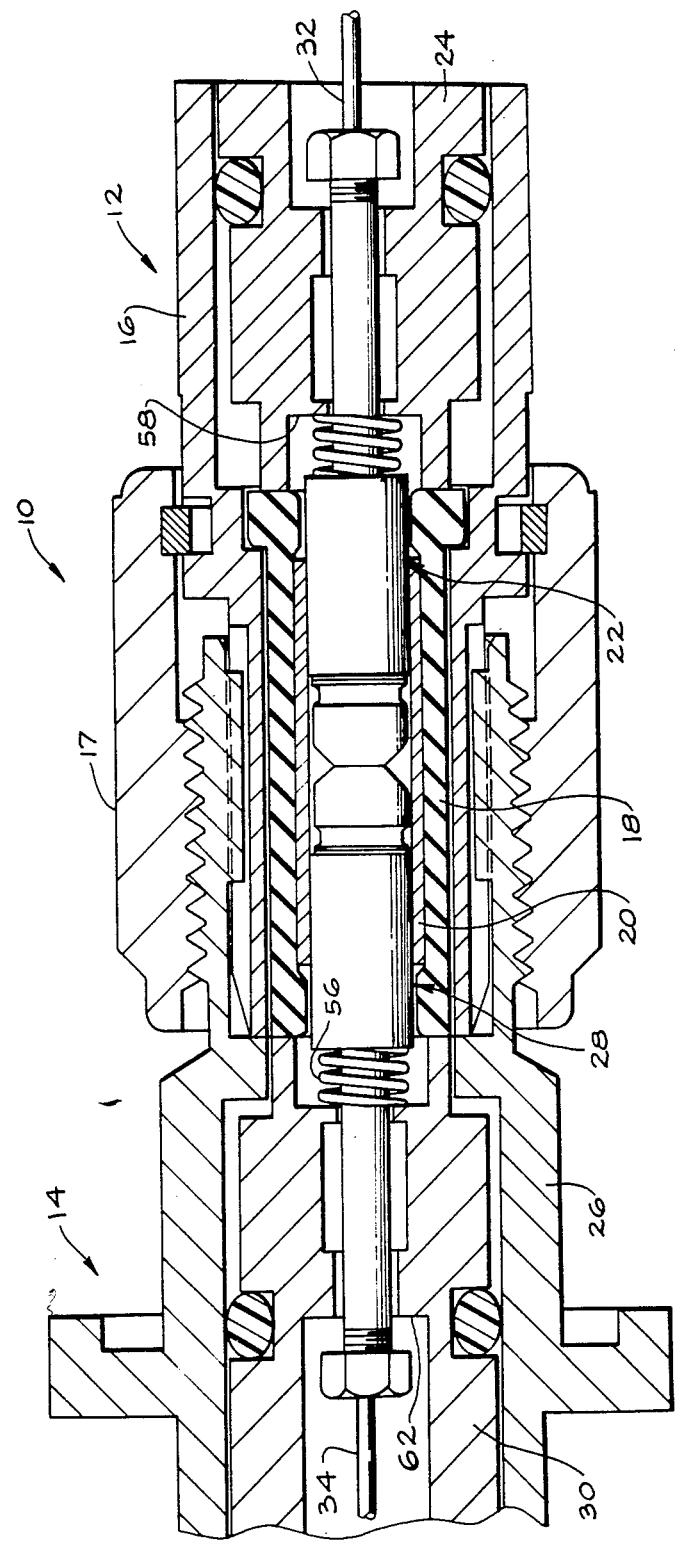
FIG. 1 is a partial longitudinal sectional view through the connector of the present invention showing one pair of contacts mated in the connector.

Referring now to FIG. 1 of the drawings in detail, there is illustrated the connector of the present invention, generally designated 10, which comprises a plug connector member 12 and a mating receptacle member 14. The plug connector member comprises a shell 16 having a coupling nut 17 rotatably mounted thereon. An elastomeric sleeve 18 is mounted in the forward end of the shell 16. A rigid metal guide sleeve 20 is mounted within the elastomeric sleeve 18. A contact, generally designated 22, is mounted in a yoke 24 in the shell 16. The forward end of the contact extends into the guide sleeve 20.

The receptacle connector member 14 comprises a shell 26 containing a second contact 28, which is identical to the contact 22, mounted in a yoke 30 in the shell 26. When the plug and receptacle connector members are mated, the forward end of the plug connector member extends into the front of the shell 26 of the receptacle member, and the forward end of the contact 28 extends into the guide sleeve 20. The coupling nut 17 is threadingly engaged with the shell 26 so that, upon rotating the coupling nut, the plug and receptacle connector members may be drawn together in mating relationship. When the connector halves are mated, the contacts 22 and 28 are aligned in the guide sleeve 20, thus coupling the single optical fiber cables 32 and 34 connected to the contacts 22 and 28, respectively. The connector described so far is similar to that disclosed in the aforementioned McCartney application.

Figure 2:
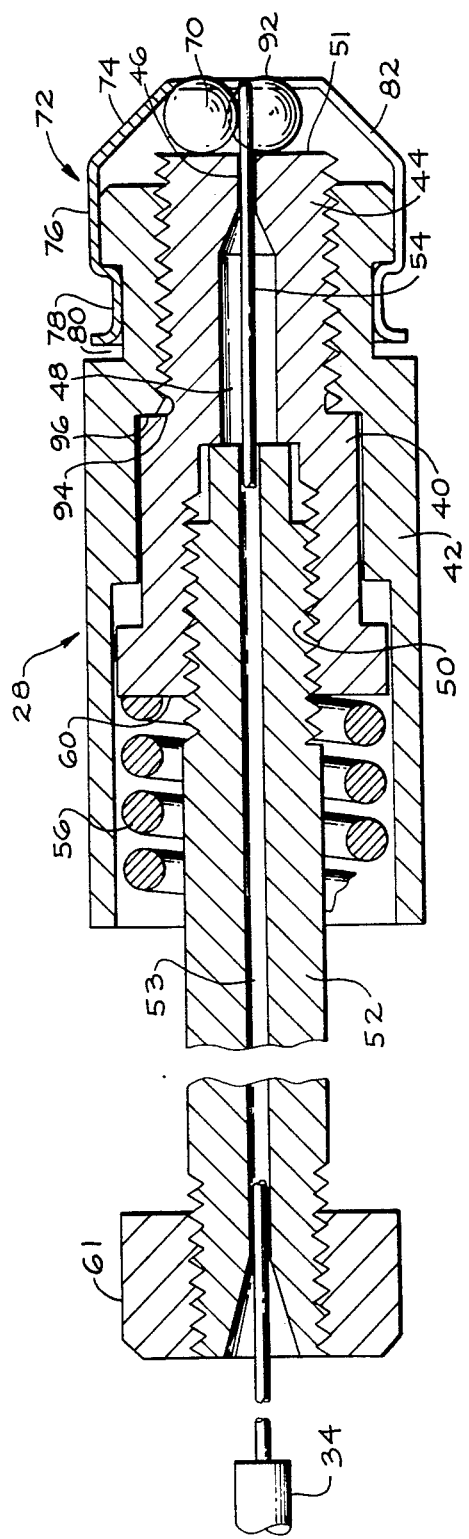
FIG. 2 is an enlarged, longitudinal sectional view of one of the contacts employed in the connector illustrated in FIG. 1.
Figure 3:
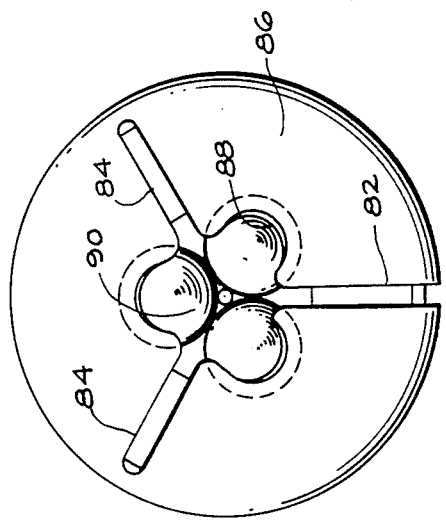
FIG. 3 is a front end view of the contact illustrated in FIG. 2.

Reference is now made to FIGS. 2 and 3 of the drawings which illustrate in detail one of the contacts used in the connector of the present invention, namely, the contact 28. The contact comprises a support body 40 having a cap 42 threadedly mounted on its forward mating end 44. A bore extends longitudinally through the body 40, and comprises a forward section 46, an intermediate section 48, and a rear section 50. The forward section 46 of the bore opens at the front face 51 of the support body, and is dimensioned to slidably receive the single optical fiber 54 of the cable 34. The intermediate section 48 of the bore is larger than the section 46 and comprises an epoxy chamber, the use of which will be described later herein. The rear section 50 of the bore is larger than the section 48, and is threaded to threadedly receive the forward end of an elongated tube 52. The tube has an axial bore 53 therethrough which is coaxial with the forward section 46 of the bore in the support body 40, and receives the fiber 54 therethrough.

A coil spring 56 surrounds the tube 52. The rear convolution of the spring engages an inwardly extending flange 58 on the yoke 30 while the forward convolution of the spring engages the rear 60 of the support body 40. The spring serves to resiliently bias the contact 28 in the forward direction in the connector so that when the two connector halves 12 and 14 are mated, the forward ends of the contacts will engage under resilient pressure. A stop nut 61 is mounted on the rear of the tube 52 behind an inwardly extending flange 62 on the yoke 30. When the connector halves are unmated, the spring 56 shifts the contact in the rightward direction as viewed in FIG. 2 until the stop nut 60 engages the rear of the flange 62.

The contact utilizes a plurality (preferably three, as shown) of alignment spheres 70 which are positioned in closely adjacent relationship to define a tricuspid interstitial space therebetween into which the forward end of the optical fiber 54 extends. As described in detail in the aforementioned Deacon patent, when the two contacts 22 and 28 are mated, the spheres in the contacts nest with respect to each other, thereby bringing the optical fibers into precise lateral alignment.

Preferably, the spheres 70 and fiber 54 are purposely dimensioned so that when the two sets of spheres in the two contacts nest with respect to each other, the spheres of each set engage their respective optical fiber, but are out of engagement with each other, as best seen in FIG. 3. In other words, the fiber has an interference fit in the interstitial space between the spheres. This arrangement has the advantage that the fiber is not loose in the interstitial space and, therefore, more precise lateral alignment of the fibers in the mating contacts can be achieved. As in the aforementioned McCartney contact, this arrangement requires some means must be provided for releasing the spring pressure on the spheres in order to insert the fiber into the interstitial space between the spheres. Also, the spring pressure must be closely controlled to assure that the spheres will not fracture the fiber when the spring pressure is applied to the spheres, which may occur with a spring-loaded sleeve as disclosed in the aforementioned McCartney application. To this end, in accordance with the invention, a spring sleeve 72 is fixedly mounted on the cap 42. The sleeve is a precise spring member fabricated by a standard stamping process, which is well-known in the art, which assures that the spring action of the sleeve is closely controlled.

The spring sleeve 72 has a frusto conical forward section 74, an intermediate cylindrical section 76, and a rear section 78 which is bent radially inwardly to snugly fit in an annular groove 80 in the cap to retain the sleeve thereon. The frusto conical forward section 74 extends forwardly of the front face 51 and inwardly over the outer perimeter region of the spheres 70. A longitudinal slit 82 extends the entire length of the spring sleeve to facilitate mounting the sleeve on the cap. Two longitudinally extending slots 84 extend from the front end of the frusto conical section 74 of the sleeve rearwardly toward, but short of, the cylindrical section 76 of the sleeve. The slit 82 and slots 84 define three equally spaced forwardly and inwardly extending resilient fingers 86. The forward end of each finger embodies a circular cut-out 88 defining a central opening 90 of generally cloverleaf configuration. The forwardmost surfaces 92 of the spheres 70 project through the respective circular cut-outs 88 in the fingers 86 so they are free to engage the spheres of the mating contact, yet the front perimeters of the fingers extend sufficiently forward to retain the spheres within the contact. The fingers 86 resiliently bias the spheres 70 radially inwardly to compact about the fiber 54 and rearwardly against the front face 51 of the contact body 40.

Because the spring sleeve 72 is snugly fitted on the contact body and the resilient fingers 86 have precise spring characteristics because they are manufactured by a precise stamping process, the spring sleeve will produce a controlled and uniform force upon the spheres, which is not subject to alteration or excessive forces such as is a loose sliding sleeve biased by a coil spring as in the prior art. Therefore, the spring sleeve of the invention assures that the spheres will be compacted about the fiber without crushing the fiber.

If desired, the contact body can be made of one piece, in which case a tool would be required to lift the resilient fingers 86 away from the front of the contact to release the pressure on the sphere so that a fiber may be inserted into the interstitial space between the spheres. However, in the embodiment illustrated in the drawings, the adjustment of the spheres may be achieved by threading the cap 42 forwardly on the contact body 40, whereby the front face 51 of the body will move rearwardly relative to the spheres 70 so that the force of the resilient fingers 86 will be released from the spheres. Such movement of the cap allows a fiber to be freely inserted into the interstitial space between the spheres.

It will be noted that the central opening 90 defined by the forward ends of the fingers 86 of the spring sleeve is sufficiently large so that when the cap is threaded forwardly on the contact body 40, the spheres may be inserted through the opening 90 during assembly of the contact, or may be removed therefrom if the spheres ever become damaged.

After the fiber 54 is inserted into the interstitial space between the spheres, the cap is threaded rearwardly on the body 40 until a rearwardly facing shoulder 94 on the cap engages a forwardly facing shoulder 96 on the body thereby limiting rearward movement of the cap relative to the body and, thereby, precisely controlling the deflection and hence the resilient pressure applied by the fingers 86 against the spheres. Thus, it will be appreciated that the threaded cap 42 provides means for selectively moving the front face 51 of the contact body 40 rearwardly relative to the resilient fingers 86 to reduce the resilient force of the fingers upon the spheres. Further, the abutting shoulders 94 and 96 and the cap and body, respectively, provide cooperating means which limit the distance that the cap can be shifted rearwardly on the body whereby the fingers may be located at a selected axial position relative to the contact body to thereby apply a predetermined resilient force against the spheres. Such force is less than that which would cause the spheres to fracture the optical fiber 54 mounted in the interstitial space therebetween.

In assembly of the contact 28, the jacket on the optical fiber cable 34 is removed at its forward end providing the bared fiber 54. The tube 52 is removed from the contact body 40, and the bare fiber is extended through the bore 53 in the tube a sufficient distance so that the fiber can be inserted into the support body 40 with the tube spaced behind the body. By loosening the cap 42, the forward end of the fiber is inserted into the interstitial space between the spheres, and thereafter the cap is threaded rearwardly until the shoulder 94 abuts the shoulder 96 on the support body. Then a syringe may be inserted into the bore in the support body 40 to inject an epoxy into the chamber 48 at the front of the body. Thereafter, the tube 52 is threaded into the rear of the support body 40. When the epoxy cures, it secures the optical fiber at the forward end of the contact so that if any difference of expansion occurs between the fiber and the contact body, the expansion will take place behind the mating end of the contact, thus avoiding movement of the front tip of the fiber.

If the contact body were made of one piece, as mentioned previously herein, a radial aperture, not shown, could be provided in the body leading to the bore 48 for injection of the epoxy therein.

Thus, by the present invention, there is provided an inexpensive and an effective arrangement for applying a precise, controlled spring force against the spheres of the contact, which force may be relieved in order to insert over-sized fibers into the space between the spheres, yet without the problem of uncontrolled spring forces and sliding parts causing too great forces being applied to the spheres which might fracture the fragile optical fiber mounted therebetween.

What is claimed is:

1. A single optical fiber contact comprising:
   a support body having a mating forward end;
   a set of spheres of equal diameter at said forward end, said spheres being arranged in closely adjacent, but not necessarily engaging, relationship defining an interstitial space therebetween;
   said support body embodying means for positioning a single optical fiber so that the end portion thereof lies in said interstitial space, said spheres being dimensioned to each engage said optical fiber in said space;
   a plurality of inwardly and forwardly extending resilient fingers fixedly mounted at said forward end of said support body urging said spheres inwardly toward the center of said space; and
   the forwardmost surfaces of said spheres extending forwardly of said fingers for nesting with the spheres of a mating contact.

2. A single optical fiber contact as set forth in claim 1 wherein:
   said set consists of three of said spheres; and
   said plurality of resilient fingers consists of three circumferentially spaced fingers arranged such that each finger overlies a portion of a corresponding one of said spheres.

3. A single optical fiber contact as set forth in claim 2 wherein:
   each said resilient finger has a circular cut-out at its forward end through which its corresponding sphere protrudes.

4. A single optical fiber contact as set forth in claim 1 wherein:
   said support body has a front face on said forward end thereof; and
   said resilient fingers urge said spheres rearwardly against said front face thereby retaining said spheres on said support body.

5. A single optical fiber contact as set forth in claim 4 including:
   means for selectively moving said front face rearwardly relative to said resilient fingers to reduce the resilient force of said fingers upon said spheres.

6. A single optical fiber contact as set forth in claim 5 wherein:
   the forward ends of said resilient fingers are spaced apart a sufficient distance to provide a central opening large enough to allow a sphere to pass therethrough after said front face has been moved rearwardly a predetermined distance relative to said fingers.

7. A single optical fiber contact as set forth in claim 5 including:
   a cap threadedly mounted on the forward end of said support body;
   said resilient fingers being carried by said cap; and
   the threaded mounting of said cap on said body constitutes said selective moving means.

8. A single optical fiber contact as set forth in claim 7 including:
   a spring sleeve mounted on said cap, said resilient fingers being integral with said sleeve.

9. A single optical fiber contact as set forth in claim 7 including:

cooperating means on said cap and support body limiting the distance that said cap can be threaded rearwardly on said body whereby said fingers may be located at a selected axial position relative to said body to thereby apply a predetermined resilient force against said spheres.

10. A single optical fiber contact as set forth in claim 9 wherein:
said predetermined force applied against said spheres is less than that which cause said spheres to fracture an optical fiber in said interstitial space.

11. A single optical fiber contact as set forth in claim 1 wherein:
said spheres are spaced from each other when a fiber is mounted in said interstitial space; and
said resilient fingers apply a force against said spheres less than that which would cause said spheres to fracture an optical fiber in said space.

* * * * *